United States Patent
Mathur et al.

(10) Patent No.: US 11,442,864 B2
(45) Date of Patent: Sep. 13, 2022

(54) MANAGING PREFETCH REQUESTS BASED ON STREAM INFORMATION FOR PREVIOUSLY RECOGNIZED STREAMS

(71) Applicant: Marvell Asia Pte Ltd, Singapore (SG)

(72) Inventors: Utkarsh Mathur, San Jose, CA (US); Harold W. Cain, III, Raleigh, NC (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 17/346,608

(22) Filed: Jun. 14, 2021

(65) Prior Publication Data

US 2021/0406184 A1 Dec. 30, 2021

Related U.S. Application Data

(60) Provisional application No. 63/045,681, filed on Jun. 29, 2020.

(51) Int. Cl.
*G06F 12/08* (2016.01)
*G06F 12/0862* (2016.01)
(Continued)

(52) U.S. Cl.
CPC .......... *G06F 12/0862* (2013.01); *G06F 9/324* (2013.01); *G06F 9/3802* (2013.01);
(Continued)

(58) Field of Classification Search
CPC .................................................. G06F 12/0862
(Continued)

(56) References Cited

U.S. PATENT DOCUMENTS 5,761,706 A 6/1998 Kessler et al.
6,976,147 B1 12/2005 Isaac et al.
(Continued)

OTHER PUBLICATIONS

Michaud, Pierre, "A Best-Offset Prefetcher", 2nd Data Prefetching Championship, Jun. 2015, Portland, France, 2015 <hal-01165600>.
(Continued)

*Primary Examiner* — Jae U Yu
(74) *Attorney, Agent, or Firm* — Young Basile Hanlon & MacFarlane, P.C.

(57) ABSTRACT

Managing prefetch requests associated with memory access requests includes storing stream information associated with multiple streams. At least one stream was recognized based on an initial subset of memory access requests within a previously performed set of related memory access requests and is associated with stream information that includes stream matching information and stream length information. After the previously performed set has ended, a matching memory access request is identified that matches with a corresponding matched stream based at least in part on stream matching information within stream information associated with the matched stream. In response to identifying the matching memory access request, the managing determines whether or not to perform a prefetch request for data at an address related to a data address in the matching memory access request based at least in part on stream length information within the stream information associated with the matched stream.

20 Claims, 5 Drawing Sheets

(51) Int. Cl.
*G06F 12/0875* (2016.01)
*G06F 9/32* (2018.01)
*G06F 9/38* (2018.01)

(52) U.S. Cl.
CPC ........ *G06F 9/3818* (2013.01); *G06F 12/0875* (2013.01); *G06F 2212/1021* (2013.01)

(58) Field of Classification Search
USPC ........................................................ 711/137
See application file for complete search history.

(56) References Cited

U.S. PATENT DOCUMENTS

| | | | |
|---|---|---|---|
| 7,350,029 | B2 | 3/2008 | Fluhr et al. |
| 7,383,418 | B2 | 6/2008 | Janik et al. |
| 7,487,296 | B1 | 2/2009 | Iacobovici et al. |
| 7,516,279 | B2 | 4/2009 | Griswell, Jr. et al. |
| 7,627,742 | B2 | 12/2009 | Bose et al. |
| 7,716,424 | B2 | 5/2010 | Franaszek et al. |
| 7,917,702 | B2 | 3/2011 | Morrow et al. |
| 8,103,832 | B2 | 1/2012 | Gara et al. |
| 8,433,852 | B2 | 4/2013 | Hu et al. |
| 8,443,151 | B2 | 5/2013 | Tang et al. |
| 8,856,452 | B2 | 10/2014 | Sun et al. |
| 9,026,739 | B2 | 5/2015 | Manne et al. |
| 9,098,418 | B2 | 8/2015 | Kannan et al. |
| 10,013,357 | B2 | 7/2018 | Mukherjee et al. |
| 2004/0117510 | A1* | 6/2004 | Arimilli ................ G06F 15/167 709/212 |
| 2009/0199190 | A1 | 8/2009 | Chen et al. |
| 2011/0010506 | A1 | 1/2011 | Greer et al. |

OTHER PUBLICATIONS

Nesbit, K. J. and Smith, J. E., "Data Cache Prefetching Using a Global History Buffer", HPCA '04 Proceedings of the 10th International Symposium on High Performance Computer Architecture (p. 96).

T. Chen and J. Baer, "Effective Hardware-Based Data Prefetching for High-Performance Processors," IEEE Transactions on Computers: vol. 44, No. 5, pp. 609-623, May 1995.

W. Heirman et al., "Near-Side Prefetch Throttling: Adaptive Prefetching for High-Performance Many-Core Processors," PACT '18, Nov. 1-4, 2018, Limassol, Cyprus.

Hur, I. and Lin, C., "Memory Prefetching Using Adaptive Stream Detection", MICRO 39: Proceedings of the 39th Annual Symposium on Microarchitecture (p. 397-408), Dec. 2006.

Jain, A. and Lin, C., "Linearizing irregular memory accesses for improved correlated prefetching", MICRO 46: Proceedings of the 46th Annual IEEE/ACM International Symposium on Microarchitecture (p. 247-259), Dec. 2013.

Mutlu, O. et al., "Runahead execution: an alternative to very large instruction windows for out-of-order processors", HPCA '03: Proceedings of the 9th International Symposium on High-Performance Computer Architecture, Feb. 2003.

Srinath, S. et al., "Feedback Directed Prefetching: Improving the Performance and Bandwidth-Efficiency of Hardware Prefetchers", HPCA '07 Proceedings of the 2007 IEEE 13th International Symposium on High Performance Computer Architecture (p. 63-74), Feb. 2007.

Zhuang, X. et al.., "Accurate, efficient, and adaptive calling context profiling", PLDI '06 Proceedings of the 27th ACM SIGPLAN Conference on Programming Language Design and Implementation (p. 263-271), Jun. 2006.

* cited by examiner

MANAGING PREFETCH REQUESTS BASED ON STREAM INFORMATION FOR PREVIOUSLY RECOGNIZED STREAMS

CROSS-REFERENCE TO RELATED APPLICATION(S)

This application claims priority to and the benefit of U.S. Provisional Application Ser. No. 63/045,681, filed Jun. 29, 2020, the entire disclosure of which is hereby incorporated by reference.

TECHNICAL FIELD

This disclosure relates to managing prefetch requests based on stream information for previously recognized streams.

BACKGROUND

Modern processors employ a variety of techniques to avoid large performance penalties due to long delays associated with accessing main memory (e.g., in the event of a cache miss), called memory access latency. Prefetching is an example of an approach to mitigate some of the memory access latency by predicting a program's future memory accesses and storing a copy of that data (e.g., a cache line, also called a cache block) in at least one level of a cache hierarchy in a processor system. Prefetching techniques can include any of a variety of strategies including sequential prefetching (e.g., fetching a cache line immediately following a currently accessed cache line), strided stream prefetching (e.g., a sequence of multiple requests for values, where the address offset between adjacent values in the sequence, called the stride, is a fixed positive or negative offset), or correlated stream prefetching (e.g., training based on a pattern of memory addresses accessed and storing metadata corresponding to the pattern to predict future addresses). The prefetch request is used to preload a cache level (e.g., of a data cache) so that the future memory request will hit in that cache level instead of having to access a higher cache level or a main memory. A stream may be recognized (or learned) after one or more prefetched values have been successfully predicted. Some processors may be configured to perform prefetching concurrently for multiple separate, independent streams.

SUMMARY

In one aspect, in general, an integrated circuit comprises: a cache system configured to store copies of data previously retrieved from a memory system; at least one processor core executing instructions in a pipeline, wherein the pipeline includes at least one stage that executes instructions that initiate memory access requests to access data in the memory system using requests to the cache system; circuitry configured to manage prefetch requests associated with one or more memory access requests. The managing includes: storing stream information associated with a plurality of streams, wherein at least one of the streams was recognized based on an initial subset of memory access requests within a previously performed set of related memory access requests and is associated with stream information that includes stream matching information and stream length information, after the previously performed set of related memory access requests has ended, identifying a matching memory access request that matches with a corresponding matched stream in the plurality of streams based at least in part on stream matching information within stream information associated with the matched stream, and in response to identifying the matching memory access request, determining whether or not to perform a prefetch request for data at an address related to a data address in the matching memory access request based at least in part on stream length information within the stream information associated with the matched stream.

In another aspect, in general, a method comprises: storing copies of data previously retrieved from a memory system; executing instructions in a pipeline, wherein the pipeline includes at least one stage that executes instructions that initiate memory access requests to access data in the memory system using requests to the stored copies; and managing prefetch requests associated with one or more memory access requests. The managing includes: storing stream information associated with a plurality of streams, wherein at least one of the streams was recognized based on an initial subset of memory access requests within a previously performed set of related memory access requests and is associated with stream information that includes stream matching information and stream length information, after the previously performed set of related memory access requests has ended, identifying a matching memory access request that matches with a corresponding matched stream in the plurality of streams based at least in part on stream matching information within stream information associated with the matched stream, and in response to identifying the matching memory access request, determining whether or not to perform a prefetch request for data at an address related to a data address in the matching memory access request based at least in part on stream length information within the stream information associated with the matched stream.

In another aspect, in general, an apparatus comprises: means for storing copies of data previously retrieved from a memory system; means for executing instructions in a pipeline, wherein the pipeline includes at least one stage that executes instructions that initiate memory access requests to access data in the memory system using requests to the stored copies; and means for managing prefetch requests associated with one or more memory access requests. The managing includes: storing stream information associated with a plurality of streams, wherein at least one of the streams was recognized based on an initial subset of memory access requests within a previously performed set of related memory access requests and is associated with stream information that includes stream matching information and stream length information, after the previously performed set of related memory access requests has ended, identifying a matching memory access request that matches with a corresponding matched stream in the plurality of streams based at least in part on stream matching information within stream information associated with the matched stream, and in response to identifying the matching memory access request, determining whether or not to perform a prefetch request for data at an address related to a data address in the matching memory access request based at least in part on stream length information within the stream information associated with the matched stream.

Aspects can include one or more of the following features.

The stream matching information depends on: (1) an address of data being requested by a memory access request in the initial subset of memory access requests, and (2)

calling context information associated with an instruction that initiated the memory access request in the initial subset of memory access requests.

The pipeline includes at least one stage that issues instructions based on a program counter that identifies addresses of decoded instructions in the memory system.

The calling context information associated with the instruction that initiated the memory access request in the initial subset of memory access requests includes a value of the program counter that corresponds to an address of the instruction that initiated the memory access request in the initial subset of memory access request.

The calling context information associated with the instruction that initiated the memory access request in the initial subset of memory access requests includes status information associated with execution of the instruction that initiated the memory access request in the initial subset of memory access request.

The calling context information associated with the instruction that initiated the memory access request in the initial subset of memory access requests includes branch history information associated with one or more branch instructions that were executed before execution of the instruction that initiated the memory access request in the initial subset of memory access request.

The stream length information depends on a total number of memory access requests within the previously performed set of related memory access requests.

Determining whether or not to perform a prefetch request for data at an address related to a data address in the matching memory access request further includes comparing a number of memory access requests in a current instance of the matched stream to a first stored threshold value if the stream length information indicates a previous instance of the matched stream had a length shorter than a second stored threshold value.

The second stored threshold value changes dynamically in response to total numbers of memory access requests within multiple previous instances of the matched stream.

The first stored threshold is based at least in part on a lookahead value associated with one or more of the prefetch requests.

Different ones of the plurality of streams are associated with different values of the second stored threshold value.

Different ones of the plurality of streams are associated with the same value of the second stored threshold value.

Aspects can have one or more of the following advantages.

The prefetch management techniques described herein are able to capture information about typical lengths of different instances of a stream of related memory access requests, which can be used to mitigate cache pollution. Calling context information associated with different streams can be stored and used to identify a portion of a program (e.g., using a program counter) that initiated the stream. If the length of the stream is relatively short, prefetching can be delayed to avoid storing prefetched data in the cache that will not be requested by the stream. If the length of the stream is relatively long, prefetching can be initiated sooner given a higher likelihood that the prefetched data will be requested by the stream. One or more thresholds for determining whether stream qualifies as long or short can be selected based on a lookahead value that accounts for memory access latency.

These and other aspects and advantages are disclosed in the following detailed description of the implementations, the appended claims and the accompanying figures.

BRIEF DESCRIPTION OF THE DRAWINGS

The disclosure is best understood from the following detailed description when read in conjunction with the accompanying drawings, wherein like reference numerals refer to like parts throughout the several views. It is emphasized that, according to common practice, the various features of the drawings are not to-scale. On the contrary, the dimensions of the various features are arbitrarily expanded or reduced for clarity.

DETAILED DESCRIPTION

Figure 1:
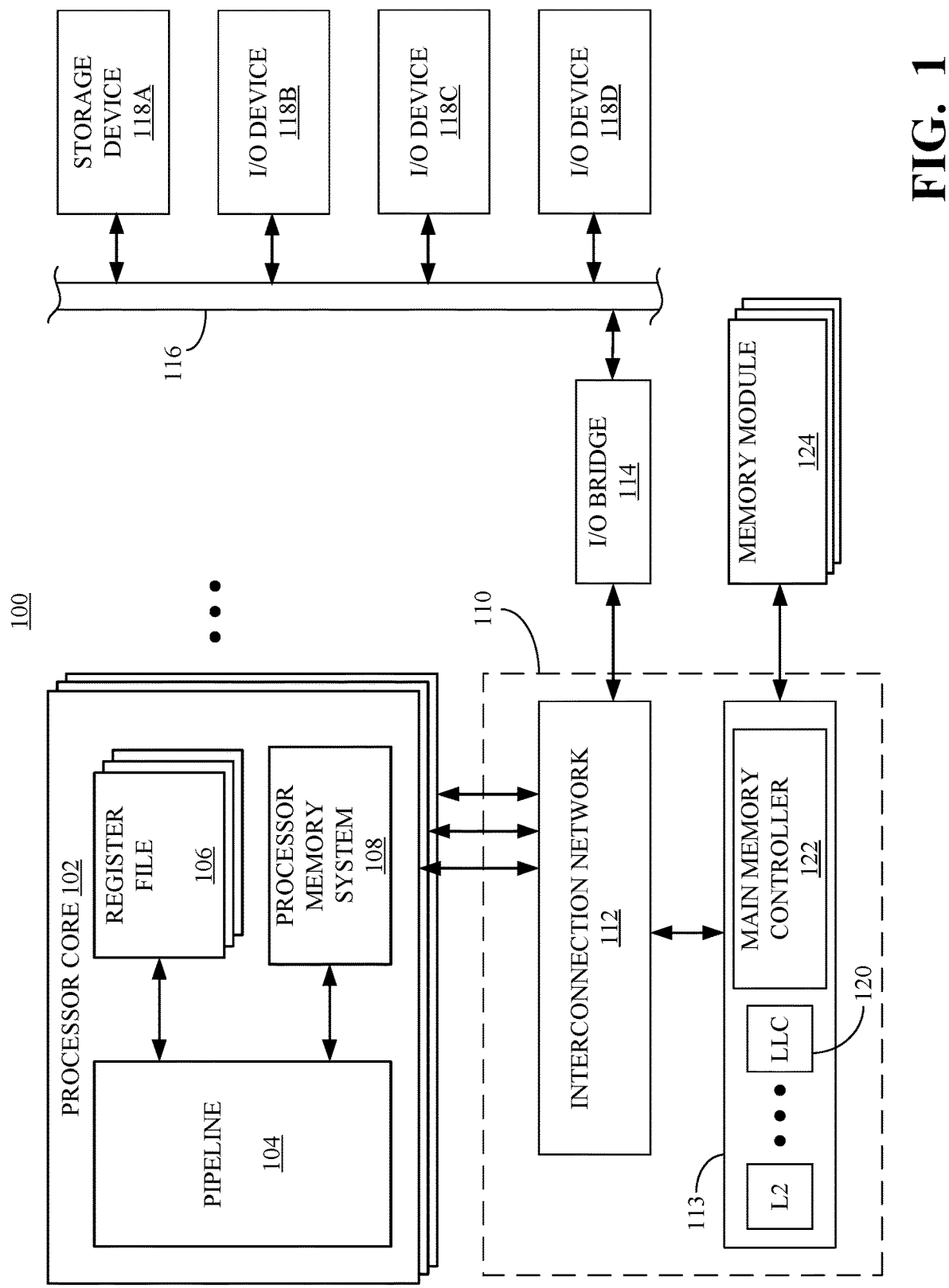
FIG. 1 is a schematic diagram of an example of a computing system 100.
Figure 2:
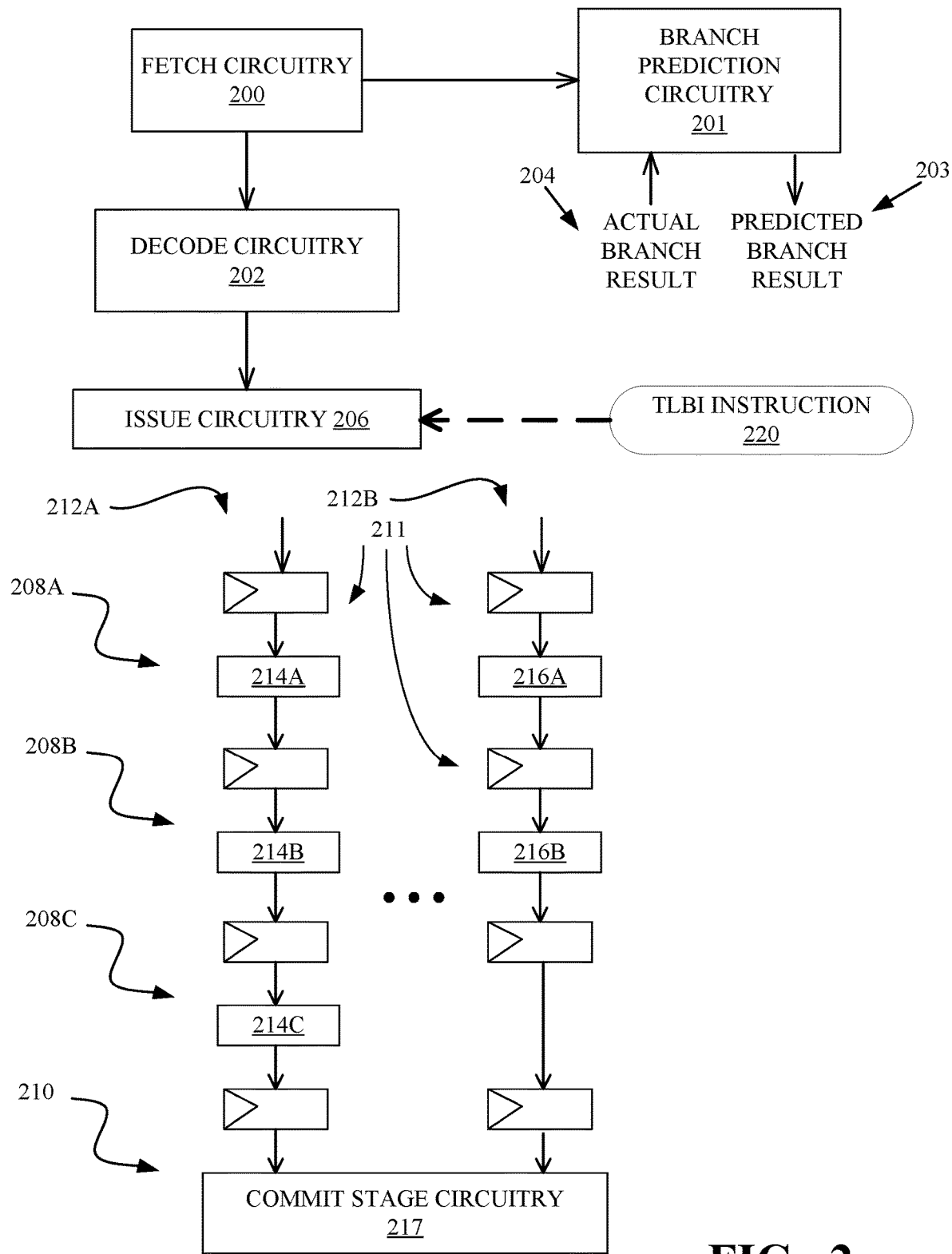
FIG. 2 is a schematic diagram of an example of a configuration of the pipeline of FIG. 1.
Figure 3:
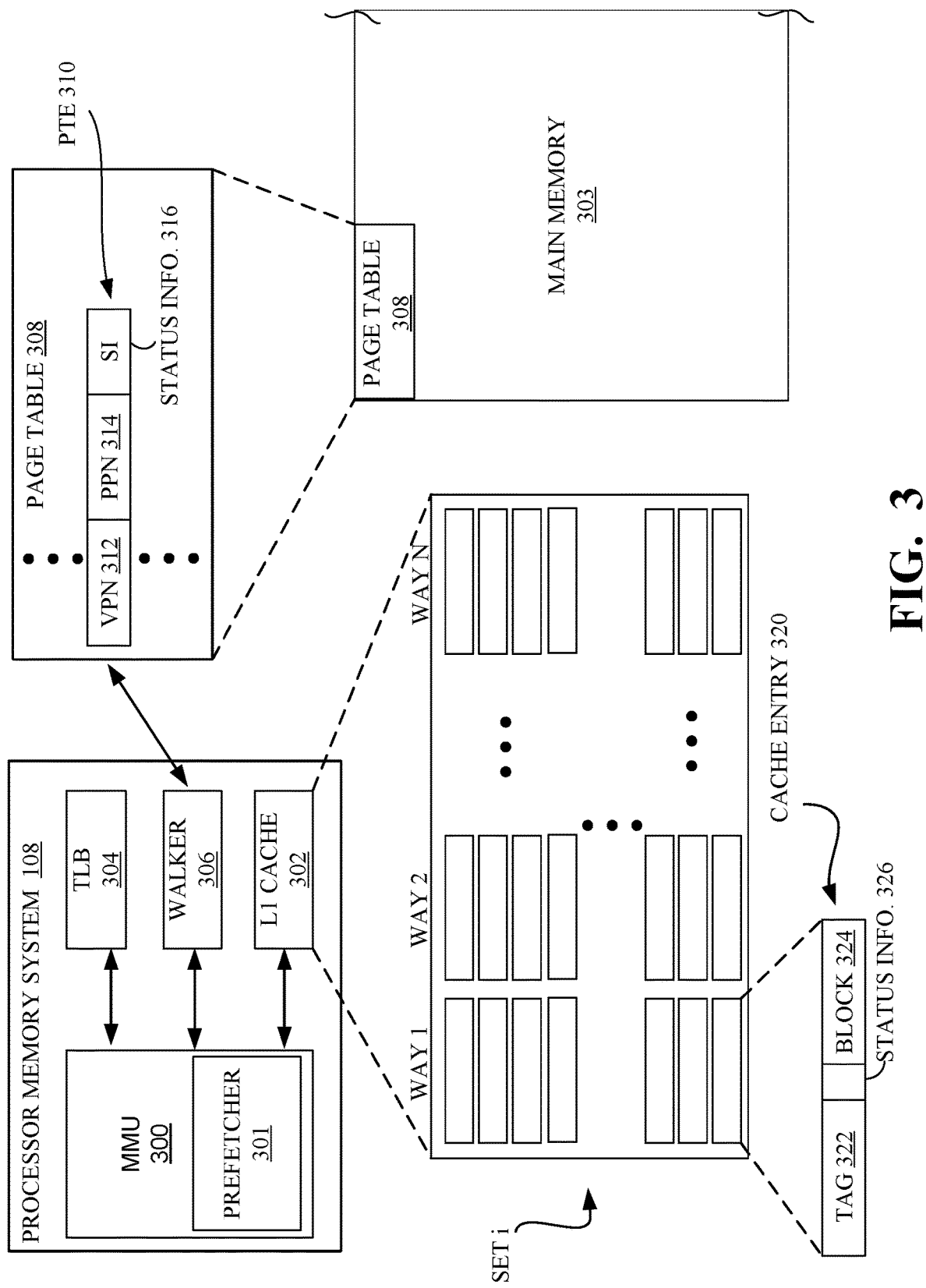
FIG. 3 is a schematic diagram of an example of a configuration of the processor memory system of FIG. 1.

Further details of techniques for managing prefetch requests based on stream information for previously recognized streams are described herein with initial reference to a system in which they can be implemented, as shown in FIGS. 1 through 3.

FIG. 1 is a high-level block diagram of an example of a computing system 100. The computing system 100 includes at least one processor core 102, which can be a single central processing unit (CPU) or one of multiple processor cores in a multi-core architecture. In a multi-core architecture, each processor core (or simply "core") can include an individual CPU with associated circuitry. In this example of a multi-core architecture, each processor core 102 can include a pipeline 104, one or more register files 106, and a processor memory system 108. Each register file of the register files 106 can include one or more individually addressable registers.

Each processor core 102 can be connected to additional processor circuitry 110. The additional processor circuitry 110 can include an interconnection network 112 and an external memory system 113. The interconnection network 112 can be a bus, a cross-bar switch, a mesh network, or some other interconnection network. The interconnection network 112 can enable communication between each processor core 102 and the external memory system 113 and/or an input/output (I/O) bridge 114.

The I/O bridge 114 can enable communication, such as over an I/O bus 116, with various different I/O devices including a storage device 118A and other I/O devices 118B-118D. Non-limiting examples of the other I/O devices 118B-118D can include a network interface, a display adapter, or user input devices such as a keyboard or a mouse.

The storage device 118A can be a disk drive or some other large capacity storage device. The storage device 118A can typically be a non-volatile storage device. In some examples, the storage device 118A, or a portion thereof, can be used in a virtual memory scheme. For example, a portion of the storage device 118A can serve as secondary storage (or a 'backing store') in a virtual memory scheme for the (typically volatile and/or capacity-limited) main memory. Examples of main memory include the processor memory system 108 or an external memory system, such as described below with respect to the external memory system 113.

The processor memory system 108 and the external memory system 113 together form a hierarchical memory system. The hierarchy can include any number of levels. The levels may be denoted or referred to as L1, L2, . . . , LN. The L1 level is a lower level memory than the L2 memory system, which in turn is a lower level than the L3 memory system, and so on. Typically, each level of the hierarchical memory system can include memory (e.g., a memory system) that is slower to access than that of the immediately lower level and/or each level of the hierarchical memory system can include memory (e.g., a memory system) that is faster to access, more limited in capacity, and/or more expensive than that of a higher level. Each level of the hierarchical memory system can serve as a cache (or a cache level).

A first level (L1) cache can be within (e.g., a part of) the processor memory system 108. Any number of higher level (L2, L3, . . . ) caches can be within the external memory system 113. The highest (i.e., last) level cache within the external memory system 113 can be referred to as the last level cache (LLC). In an example, the LLC can be the L2 cache.

At each level, the cache can include a first module that provides an instruction cache for caching instructions and a second module that provides a data cache for caching data. The memory system of a level of the hierarchical memory system can load blocks of instructions or data into entries and evict (e.g., removes, over-writes, etc.) blocks of instructions or data from entries in units of cache blocks (also called cache lines). Cache lines are further described with respect to FIG. 3.

In addition to the L1 instruction cache and data cache, the processor memory system 108 can include a translation lookaside buffer (TLB) for caching recent translations, and various other circuitry for handling a miss in the L1 instruction or data caches or in the TLB. For example, that circuitry in the processor memory system 108 of a processor core 102 can include a write buffer for temporarily holding values to be written from a store instruction being executed within the pipeline 104. The TLB is further described with respect to FIG. 3.

As already mentioned, the highest level cache within the external memory system 113 is the LLC (such as an LLC 120). The LLC 120 can be accessed (e.g., searched, etc.) just before main memory. Of course, this is only an example. The exact division between which level caches are within the processor memory system 108 and which are in the external memory system 113 can be different in other examples. For example, the L1 cache and the L2 cache can both be internal to the processor core 102 (i.e., part of the processor memory system 108) and the L3 (and higher) caches can be external to the processor core 102.

In an example, each processor core 102 can have its own internal L1 cache, and the processor cores can share an L2 cache. The external memory system 113 can also include a main memory controller 122. The main memory controller 122 can be connected to any number of memory modules 124. Each of the memory modules 124 can serve as (e.g., can be) the main memory. In a non-limiting example, one or more of the memory modules 124 can be Dynamic Random Access Memory (DRAM) modules.

In a typical example, the content of a memory address is searched for in a level (e.g., L1) of the hierarchical memory system. If not found, then the next higher level (e.g., L2) is searched; and so on. Searching for a memory address amounts to answering the question: does this memory level of the hierarchical memory system include the content of the memory address? Or, alternatively, is the memory address cached in this memory of the hierarchical memory system?

That is, in a particular cache level of the hierarchy of the hierarchical memory system, each cache entry includes space for storing the data words of a particular memory block along with bits for determining whether a particular word from a memory block is present in that cache level (i.e., a 'hit') or not present in that cache level (i.e., a 'miss'). After a miss in one level, the cache system attempts to access (i.e., read or write) the memory block from a higher level cache, or from the main memory (in the case of a miss in the LLC).

The pipeline 104 can include multiple stages through which instructions advance, a cycle at a time. The stages can include an instruction fetch (IF) stage or stages, an instruction decode (ID) stage or stages, an operand fetch (OF) stage or stages, an instruction execution (IE) stage or stages, and/or a write back (WB) stage or stages. The pipeline can include other stages, as further described with respect to FIG. 2. Some stages occur in a front-end portion of the pipeline. Some other stages occur in a back-end portion of the pipeline. The front-end portion can include pre-execution stages. The back-end portion of the pipeline can include execution and post-execution stages. The pipeline 104 is further described with respect to FIG. 2.

First, an instruction is fetched (e.g., in the IF stage or stages). An instruction can be fetched based on a program counter (PC). The PC is a pointer that can be used to identify instructions within memory (e.g., within a portion of the main memory, or within an instruction cache of the core 102). The PC can advance through addresses of a block of compiled instructions (called a "basic block"). The PC can be incremented by a particular number of bytes. The particular number of bytes for incrementing the PC can depend on how long (e.g., in bytes) each instruction is and on how many instructions are fetched at a time.

After being fetched, the instruction is then decoded (e.g., in the ID stage or stages) to determine an operation and one or more operands. Alternatively, in some pipelines, the IF and ID stages can overlap. If the instruction includes operands, the operands are fetched (e.g., in the OF stage or stages).

The instruction is then ready to be issued. Issuing an instruction starts progression of the instruction through stages in a back-end portion of the pipeline to execute the instruction. In an example, execution of the instruction can involve applying the operation of the instruction to the operand(s) to produce a result for an arithmetic logic unit (ALU) instruction. In an example, execution of the instruction can involve storing or loading to or from a memory address for a memory instruction. In an example, execution of the instruction can involve evaluating a condition of a conditional branch instruction to determine whether or not the branch should be taken.

After an instruction has completed execution, the instruction can be committed so that any effect of the instruction is made globally visible to software. Committing an instruction may involve storing a result in a register file (e.g., in the WB stage or stages), for example. In most implementations, even if any instructions were issued out-of-order, all instructions are generally committed in-order.

FIG. 2 is an example of a configuration of the pipeline 104 of FIG. 1.

The pipeline 104 can include circuitry for the various stages (e.g., the IF, ID, and OF stages). For one or more instruction fetch stages, an instruction fetch circuitry 200 provides a PC to an instruction cache in a processor memory system, such as the processor memory system 108 of FIG. 1, to fetch (e.g., retrieve, read, etc.) instructions to be fed (e.g., provided to, etc.) into the pipeline 104. For example, the PC can be a virtual address of the next instruction, in which case the PC can be incremented by the length of a virtual address in the case of sequential execution (i.e., without taking any branches). Virtual addresses are described with respect to FIG. 3.

The instruction fetch circuitry 200 can also provide the program counter, PC, to a branch prediction circuitry 201. The branch prediction circuitry 201 can be used to provide a predicted branch result 203 for branch instructions. The predicted branch result 203 enables the pipeline 104 to continue executing speculatively while an actual branch result 204 is being determined. The branch prediction circuitry 201 can also store branch history information that is updated based on receiving the actual branch result 204. In some implementations, some or all of the branch prediction circuitry 201 can be considered to be a part of the instruction fetch circuitry 200.

In an example of the out-of-order execution, for one or more instruction decode (ID) stages, instruction decode circuitry 202 can store information in an issue queue for instructions in an instruction window waiting to be issued. The issue queue (which can also be referred to as an instruction queue) is such that an instruction in the queue can leave the queue when the operands of the instruction become available. As such, the instruction can leave before earlier (e.g., older) instructions in a program being executed. The instruction window refers to a set of instructions that can execute out-of-order.

An issue circuitry 206 can determine a respective cycle in which each of the instructions in the issue queue are to be issued. Issuing an instruction makes the instruction available to progress through circuitry of instruction execution (IE) stages, such as a first execution stage 208A, a second execution stage 208B, and a third execution stage 208C, of the pipeline 104. For simplicity of explanation, only three execution stages are illustrated in FIG. 2. However, the disclosure herein is not so limited: more or fewer execution stages are possible.

The pipeline 104 can include one more commit stages, such as a commit stage 210. A commit stage commits (e.g., writes to memory) results of instructions that have made their way through the IE states 208A, 208B, and 208C. For example, a commit stage circuitry 217 may write back a result into a register file, such as the register file 106 of FIG. 1. However, some instructions may not be committed by the commit stage circuitry 217. Instead, the results of the instructions may be committed by other circuitry, such as circuitry in another stage of the back-end or a stage of the front-end, possibly based on information from the commit stage.

Between adjacent stages of the pipeline 104, the various paths through the pipeline circuitry include pipeline registers. For example, shown in FIG. 2 are pipeline registers 211 for the IE stages 208A, 208B, and 208C. The pipeline registers can be used for storing results of an upstream stage to be passed downstream to a next stage. The pipeline registers 211 may be clocked by (i.e., receive a clock signal derived from) a common clock (not shown). Thus, each clock cycle, each pipeline register 211 (also called a latch, or a set of flip-flops) can pass a result from its input to its output and becomes ready to receive a new result in its input after that result has been produced by the circuitry of that stage.

There may be multiple separate paths through the IE stages. The IE stages can include various circuitry for executing different types of instructions. For illustration purposes, only two paths 212A and 212B are shown in FIG. 2. However, the execution stages can include any number of paths with corresponding circuitry, which can be separated by pipeline registers, such as the pipeline registers 211.

The number of paths through the instruction execution stages can generally be dependent on the specific architecture. In an example, enough paths can be included such that a number of instructions up to a maximum number of instructions that can progress through the same execution stages in the same cycles. The maximum number of instructions that can progress through the same execution stages in the same cycles can be referred to as the issue width.

The number of stages that include functional circuitry for a given path may also differ. In the example of FIG. 2, a first path 212A includes functional circuitry 214A, 214B, and 214C located in the first execution stage 208A, the second execution stage 208B, and the third execution stage 208C, respectively. The second path 212B includes functional circuitry 216A and 216B located in the first execution stage 208A and the second execution stage 208B, respectively. In the second path 212B, the third execution stage 208C is a "silo stage" that passes a result along without performing further computation thereby ensuring that each path passes through the same number of stages through the pipeline.

In an example, a path can include circuitry for executing instructions using units for various operations (e.g., ALU, multiplier, floating point unit, etc.). In an example, another path can include circuitry for executing memory access instructions. The memory access instructions can include load instructions that read data values from the memory system. The memory access instructions can include store instructions to write data values to the memory system. The circuitry for executing memory access instructions can also initiate translation of virtual addresses to physical addresses, when necessary, as described in more detail below with respect to FIG. 3.

In addition to branch prediction, as described with respect to the branch prediction circuitry 201, the pipeline 104 can be configured to perform other types of speculative execution. In an example of another type of speculative execution, the pipeline 104 can be configured to reduce the chance of stalling (such as in the event of a cache miss) by prefetching. Stalling refers to the situation in which processor execution of instructions is stopped/paused.

A prefetch request can be used to preload a cache level (e.g., of a data cache) so that a future memory request is likely to hit in that cache level instead of having to access a higher cache level or a main memory. For example, a speculative memory access request can include prefetch requests that are sent to preload an instruction cache or data cache based on a predicted access pattern. Prefetching can increase performance, but prefetching that is too aggressive could also have the potential to reduce performance. For example, it is useful to ensure that the instruction or data that is preloaded is actually needed soon, and does not replace a cache entry that would have been needed sooner. The potential for such "pollution" of the cache can be reduced by some of the techniques described herein for managing prefetch requests based on stream information for previously recognized streams.

A prefetch request can be or can include a software prefetch request such that an explicit prefetch instruction that is inserted into the pipeline 104 includes a particular address to be prefetched. A prefetch request can be or can include a hardware prefetch that is performed by hardware within the processor (e.g., the processor core 102) without an explicit prefetch instruction being inserted into its pipeline (e.g., the pipeline 104).

In some cases, prefetching can include recognizing a pattern (e.g., a stream) within the memory accesses of a program, or can include speculatively performing a load instruction within a program (e.g., using a speculative address for that load instruction) before that load instruction is actually issued as part of program execution.

FIG. 3 is an example of a configuration of the processor memory system 108 of FIG. 1. In example illustrated in FIG. 3, the processor memory system 108 includes a memory management unit (MMU) 300 that manages access to the memory system. The MMU 300 can manage the translation of virtual addresses to physical addresses. In this example, the MMU 300 also includes a prefetcher 301, which includes circuitry to manage prefetch requests, as described in more detail below. In other examples, the prefetcher can be separate from the MMU or can include a portion of the MMU and/or other memory access circuitry.

In some implementations, the MMU 300 can determine whether a copy of a stored value (e.g., data or an instruction) at a given virtual address is present in any of the levels of the hierarchical cache system, such as in any of the levels from an L1 cache 303 up to the LLC 120 (FIG. 1) if necessary. If so, then the instruction accessing that virtual address can be executed using a cached copy of the value associated with that address. If not, then that instruction can be handled by miss circuitry to be executed after accessing the value from a main memory 303.

The main memory 303, and potentially one or more levels of the cache system, may need to be accessed using a physical address (PA) translated from the virtual address (VA). To this end, the processor memory system 108 can include a TLB 304 that stores translations, defined by VA-to-PA mappings, and a page table walker 306 for accessing a page table 308 if a translation is not found in the TLB 304. The translations stored in the TLB can include recently accessed translations, likely to be accessed translations, some other types of translations, or a combination thereof.

The page table 308 can store entries, including a page table entry (PTE) 310, that contain all of the VA-to-PA mappings currently in use. The page table 308 can typically be stored in the main memory 303 along with physical memory pages that represent corresponding mapped virtual memory pages that have been "paged in" from secondary storage (e.g., the storage device 118A of FIG. 1).

A memory page can include a number of cache blocks. A cache block can include a number of words. A word is of a predetermined number (e.g., 2) of bytes. A byte is a group of bits (e.g., 8 bits), which can be operated on as a unit. A byte can be considered a unit of memory size.

Alternatively, in a virtualized system with one or more guest operating systems managed by a hypervisor, virtual addresses (VAs) may be translated to intermediate physical addresses (IPAs), which are then translated to physical addresses (PAs). In a virtualized system, the translation by a guest operating system of VAs to IPAs may be handled entirely in software, or the guest operating system may have some hardware assistance from the MMU 300.

The TLB 304 can be used for caching recently accessed PTEs from the page table 308. The caching of recently accessed PTEs can enable the translation to be performed (such as in response to a load or a store instruction) without the page table walker 306 having to perform a potentially multi-level page table walk of a multiple-level data structure storing the page table 308 to retrieve the PTE 310. In an example, the PTE 310 of the page table 308 can store a virtual page number 312 and a physical page number 314, which together serve as a mapping between a VA and a PA that defines a translation of that VA.

An address (i.e., a memory address) can be a collection of bits. The bits of the memory address can be divided into low-order bits and high-order bits. For example, assuming 32-bit addresses, an example of a memory address is 01101001 00101000 00001101 01011100. The low-order bits are the rightmost 16 bits (i.e., 00001101 01011100); and the high-order bit are the leftmost 16 bits (i.e., 01101001 00101000). The low-order bits of a memory address can be used as a page offset. The low-order bits can be identical for a VA and its mapped PA. Thus, the high-order bits of a memory address can be used as a memory page number to specify the mapping.

The PTE 310 can also include status information (SI) 316. The SI 316 can indicate whether or not the page is resident in the main memory 303 or whether the page should be retrieved from secondary storage. When the PTE 310 is stored in an entry of any of the TLB 304, there may also be additional information for managing the transfer of PTEs between the page table 308 and the TLB 304, and for invalidating PTEs in the TLB 304. In an example, invalidating PTEs in the TLB 304 can be accomplished by toggling a bit (that indicates whether the entry is valid or not) to a state (i.e., a binary state) that indicates that the entry is invalid. However, other ways of invalidating PTEs are possible.

If a valid entry in the TLB 304 that matches with a portion of a VA to be translated is found (i.e., a "TLB hit"), then the PTE stored in that entry is used for translation. If there is no match (i.e., a "TLB miss"), then the page table walker 306 can traverse (or "walk") the levels of the page table 308 retrieve a PTE.

The L1 cache 302 can be implemented in any number of possible ways. In the implementation illustrated in FIG. 3, the L1 cache 302 is illustrated as being implemented as an N-way set associative cache module. Each cache entry 320 of the L1 cache 302 can include bits for storing a particular cache block 324 that has been copied from a physical page in the main memory 303 (possibly via higher level cache module).

The cache entry 320 can also include bits for storing a tag 322. The tag 322 can be made up of a number of the most significant bits of a virtual address, which are common to the words of that entry. For a virtually indexed, virtually tagged (VIVT) type of cache module, in addition to comparing a tag portion of a virtual address of desired data, the cache module can compare an index portion of the virtual address (which can be made up of middle bits between the tag and a block offset) to determine which of multiple sets may have a cache entry containing those desired data.

For an N-way set associative cache, the tag comparison can be performed N times (possibly in parallel) for the selected "set" (i). The comparison can be performed once for each of N "ways" in which a cache block containing the desired data may be stored.

The block offset can then be used to select a particular word from a cache block that is found in the cache entry (i.e., a 'cache hit'). If the tag does not match for any of the ways of the selected set (i.e., a 'cache miss'), then the cache system can attempt to retrieve the cache block from a higher level cache or from the main memory 303 (in the case of the LLC). The cache entry 320 can also include bits for storing status information 326. The status information 326 can include, for example, a valid bit and/or any flags or error correction bits.

Figure 4:
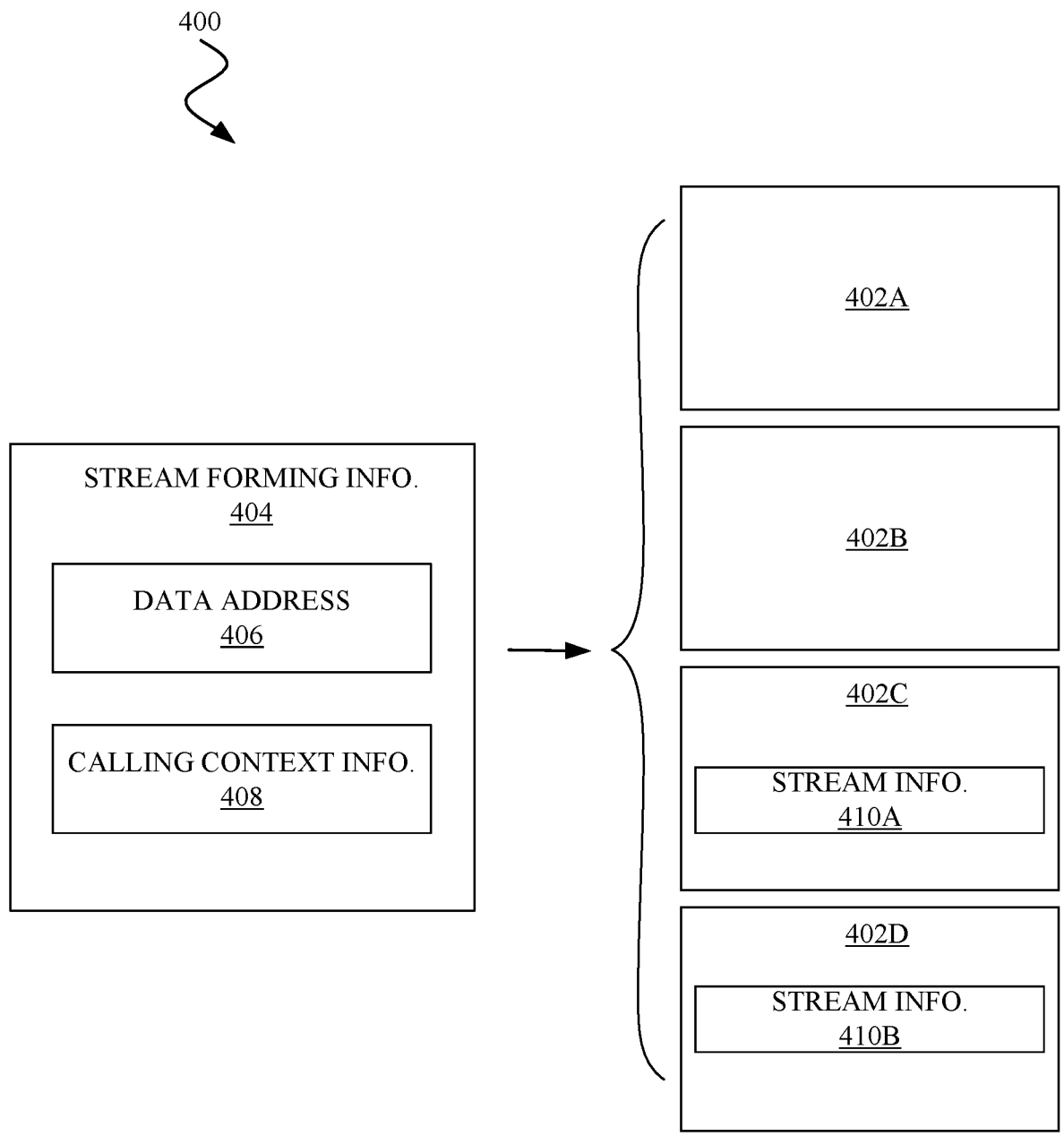
FIG. 4 is a schematic diagram of an example of stored prefetcher state information.

FIG. 4, shows an example of stored prefetcher state information 400 associated with the prefetcher 301. The prefetcher state information 400 can be stored, for example, in registers or other storage circuitry within the processor memory system 108, or other circuitry of the processor core 102, such that the prefetcher state information 400 is directly accessible to the prefetcher 301 (e.g., without needing to access the caches or main memory of the hierarchical memory system). The prefetcher state information 400 will be described with respect to streams, which, as used herein, may refer to strided streams, correlated streams, or any other potentially predictable sequence of memory addresses (virtual addresses and/or physical addresses) that may be requested by a program (or processes, threads, or any other portion of a program) that is being executed by the processor core 102.

There can also be multiple instances of a given stream. For example, an initial subset of memory access requests is associated with one instance of a recognized stream, and a subsequent subset of memory access requests is associated with another instance of that same previously recognized stream. This may occur, for example, when the same portion of a program is reached again, generating a similar access pattern, but for different memory addresses. The prefetcher state information 400 is able to capture sufficient information about that part of the program to ensure that the pattern is recognized even if the particular addresses being accessed are different. The prefetcher state information 400 can also capture information about typical lengths of different instances of the same stream, which will be useful for mitigating cache pollution, as described in more detail below.

In this example, the prefetcher state information 400 includes entries 402A and 402B for potential streams that have not yet been recognized as streams according to predetermined stream recognition criteria, and entries 402C and 402D for previously recognized streams that have been recognized as streams according to the predetermined stream recognition criteria. The prefetcher 301 receives a set of dynamically updated stream forming information 404 that is used as input to train the prefetcher 301 to recognize streams based on the stream recognition criteria. For example, the stream forming information 404 can include an address 406 of data that is currently being requested by a memory access request making its way through the pipeline 104, and calling context information 408 associated with an instruction that initiated the memory access request. In some implementations, the calling context information 408 includes a value of the program counter that corresponds to an address of the instruction that initiated the memory access request. In some implementations, the calling context information 408 can also include other information, such as branch history information associated with one or more branch instructions that were executed before execution of the instruction that initiated the memory access request, and/or status information associated with execution of the instruction that initiated the memory access request (e.g., indicating a status associated with one or more stages of the pipeline 104, or with other processor core circuitry at the time of execution). The calling context information 408 can be organized in the form of a call tree or call graph, for example, representing a group of instructions associated with the same portion of an executing program as the instruction that initiated the memory access request. There may be some number of memory access requests that occur (e.g., 3 memory access requests) before the prefetcher 301 has been trained, using the stream forming information 404, to recognize a given stream.

The stream forming information 404 can also be used to predict a sequence of addresses that will be requested in future memory access requests of a stream. Based on this stream forming information 404, the entries for different potential streams and different recognized streams can store metadata associated with each stream that enables the prefetcher 301 to predict addresses to be accessed in the future each time an instance of that stream is recognized. After a stream is recognized for the first time, the corresponding entry is updated to indicate a recognized stream. There is also a variety of other state information in the entry that can be updated during operation of the prefetcher 301, as explained in more detail below.

Instances of some streams that occur during execution of certain programs comprise a highly predictable set of memory access requests. In some cases, both the addresses being accessed and the total number of memory access requests in a given instance of the stream are both highly predicable. As used herein, the length of an instance of a stream is the number of memory access requests for different addresses that will be performed over the duration of that instance. Prefetchers are speculative in nature, and therefore have the possibility of mis-predicting the next address that will be requested by one or more of the memory access requests in a given instance of a stream. In such a scenario, prefetching these incorrect addresses might have harmful effects on performance since they might lead to cache thrashing and wasted use of memory bandwidth. It can be useful to have feedback or confidence mechanisms in place that detect such harmful prefetch requests and allow the prefetching algorithm used by the prefetcher to adapt, effectively throttling down the prefetcher. One potential cause of harmful prefetch requests is predicting that the length of a stream will be longer than the actual length, which could cause prefetch requests that are not useful and may pollute the cache, as explained in more detail below. In the example of FIG. 4, the entries 402C and 402D for previously recognized streams include stream information 410A and 410B, respectively, which was derived from the stream forming information 404 when the streams were initially recognized. The stream information includes information that enables matching subsequent instances of the streams and includes stream length information that characterizes estimate lengths based on previously recognized instances of the streams.

Since there is typically a latency associated with completing a memory access request (e.g., associated with copying data from main memory to a level of the cache hierarchy), the prefetcher 301 can be configured to use a "lookahead" value L that specifies how far ahead the initial prefetch request is relative to the initial memory access request in a recognized instance of a stream. This lookahead allows the latency to be accounted for so that the prefetch will be likely to be completed by the time the prefetched data is actually requested by a memory access request of the stream. The lookahead value L can be stored as an integer that represents a number of memory access requests within the stream between the initial memory access request and the initial prefetch request (inclusive). For example, the following sequence of memory addresses requested by memory access requests in a stream are represented as $A_i$, where i starts at 1 and increments for each consecutive memory access request, where there is a total of N memory addresses requested in the stream.

$$A_1, A_2, A_3, \ldots, A_L, A_{L+1}, \ldots, A_N$$

After the initial memory access request for memory address $A_1$ is recognized as starting an instance of this stream, the prefetcher 301 performs a prefetch request for $A_L$ when the lookahead value is L. Then after the memory access request for memory address $A_2$ is received, the prefetcher 301 performs a prefetch request for $A_{L+1}$, and so on. By the time the memory access request for memory address $A_L$ is received, the prefetch request for that memory address $A_L$ is likely to have been completed such that the memory address $A_L$ is available from a cache. In some computing systems, the lookahead value may be around 4 or 8, or larger (e.g., around 64).

Since the prefetcher 301 looks ahead by L memory access requests, streams of length smaller than L have associated state information in the corresponding entry that marks the stream as not being a good candidate for prefetching since the memory address that would be prefetched might be located beyond the end of the stream. Streams with lengths smaller than the look ahead value L can be referred to as "short streams." Some implementations allow each stream j to have a different associated lookahead value $L_j$. In other implementations, there is a single global lookahead value L used for all streams (or for a set of multiple streams).

In some implementations, the prefetcher 301 is configured to use a throttling approach that detects and filters out prefetch requests for streams whose predicted lengths are less than a threshold that has been set. An example of such a throttling approach includes: (1) a enabling the prefetcher 301 to identify short streams, and (2) enabling the prefetcher 301 to throttle prefetching for an identified short stream until the length of that short stream reaches a qualifying threshold. The information stored in the prefetcher state information 400 includes the following.

Each entry for a stream includes a stored value that represents the current length $R_C$, which corresponds to the number of memory access requests that have been made so far in the stream represented by the entry.

A throttling threshold $R_T$ is used to determine whether or not a particular stream should be monitored for possible throttling of its prefetching. Some implementations allow each stream j to have a different associated throttling threshold $R_{Tj}$. In other implementations, there is a single global throttling threshold $R_T$ used for all streams (or for a set of multiple streams).

Each entry for a stream includes a throttling condition $C_T$, which can be stored as a single bit to represent a Boolean value of true (when the bit is set, or equal to 1) or false (when the bit is not set, or equal to 0). When this throttling condition $C_T$ is set (true) for a stream, no prefetch requests should be issued for that stream until the current length $R_C$ meets or exceeds a qualifying threshold $R_Q$.

The throttling threshold $R_T$ is used during a training phase to determine if a stream is a short stream that needs to be throttled. In this example of the throttling approach, the throttling threshold $R_T$ is referenced after the stream ends, when the current length $R_C$ has reached the final length of the stream $R_F$, and is used for determining the throttling condition $C_T$ as follows.

$$C_T = R_F < R_T$$

The qualifying threshold $R_Q$ is used during processing of a subsequent instance of the stream when the prefetcher 301 checks the current length of that instance of the stream to determine if the prefetching should be throttled or not for each received memory access request. If the throttling condition $C_T$ is set, then the throttling decision $D_T$ is made for each memory access request for whether or not a corresponding prefetch request will be made (using the appropriate lookahead value). The Boolean value $D_T$ of true (when the bit is set, or equal to 1) or false (when the bit is not set, or equal to 0), can be computed as follows.

$$D_T = C_T \text{ AND } (R_C < R_Q)$$

For each received memory access request, when the throttling decision $D_T$ is true no prefetch request is made, and when the throttling decision is $D_T$ is false a prefetch request is made. In some implementations, qualifying threshold $R_Q$ is configured to have the same value as the throttling threshold $R_T$. Alternatively, in some implementations, the qualifying threshold can be configured to be a different value. The throttling condition $C_T$ can be set after the first instance of a given stream without being updated after subsequent instances, or the throttling condition $C_T$ can be updated after each instance or after selected instances.

When managing prefetching for a particular instance of a stream, the throttling condition $C_T$ and current length $R_C$ are initially both set to 0. The throttling threshold $R_T$ is set to a value determined to be the minimum stream length for the prefetching to operate effectively. This value may depend on memory system latencies, which may be specific to the computing system in which the prefetcher is employed. In some implementations, the value of qualifying threshold $R_Q$ is set equal to the look ahead value L. In other implementations, the value of qualifying threshold $R_Q$ is initially set be less than the look ahead value L, and can be dynamically tuned to change the aggressiveness of the throttling. Higher values of the qualifying threshold $R_Q$ result in more aggressive throttling because the stream lengths would need to increase in order for the streams to qualify as good candidates for prefetching. However, if the value of the qualifying threshold $R_Q$ is relatively high, there may be some loss of performance (due to the reduced prefetching) if the stream is not actually a short stream. If the value of the qualifying threshold $R_Q$ is relatively low, there may be some loss of performance if there end up being prefetch requests that are not useful (e.g., if the prefetched data is not used and instead potentially pollutes the cache). The values of the qualifying threshold $R_Q$ and/or the throttling threshold $R_T$ to be used for the managing prefetch throttling can be set statically, or dynamically through observed prefetcher effectiveness as the values are tuned.

Figure 5:
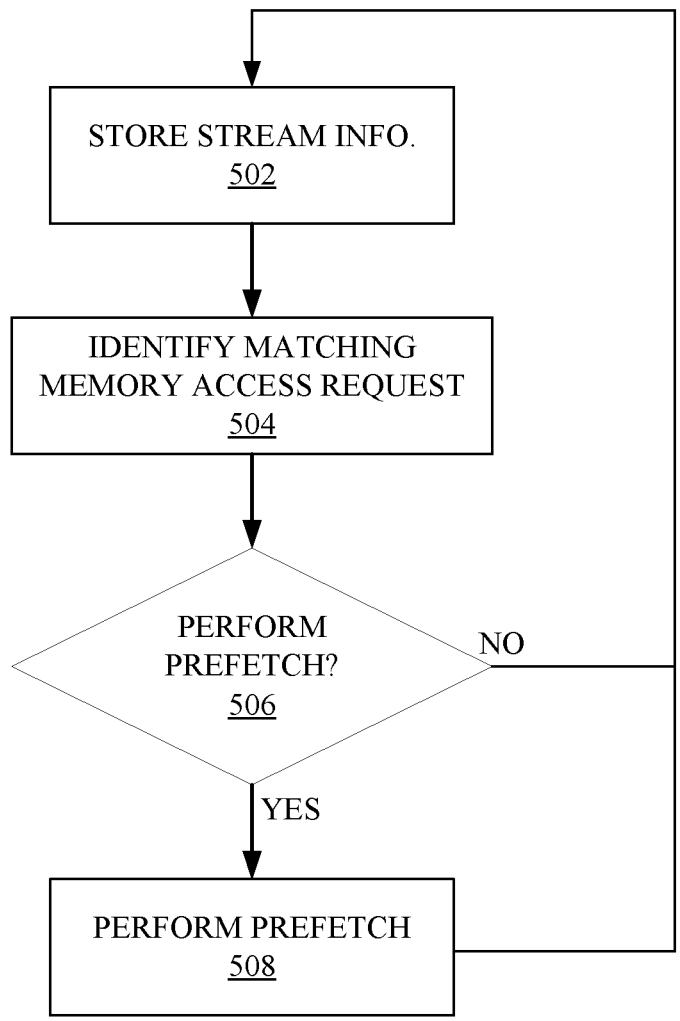
FIG. 5 is flowchart of an example procedure for managing prefetch requests.

FIG. 5 shows a flowchart for an example procedure 500 for managing prefetch requests. The procedure 500 includes storing 502 stream information associated with multiple streams. For example, each stream can be recognized based on an initial subset of memory access requests within a previously performed set of related memory access requests. The recognized stream is associated with stream information that includes stream matching information and stream length information. After the previously performed set of related memory access requests has ended (e.g., an instance of a previously recognized stream), the procedure 500 is able to identify 504 a matching memory access request that matches with a corresponding matched stream based at least in part on stream matching information within stream information associated with the matched stream. In response to identifying the matching memory access request, the procedure 500 determines 506 whether or not to perform 508 a prefetch request for data at an address related to a data address in the matching memory access request based at least in part on stream length information within the stream information associated with the matched stream. Either way, the procedure 500 continues updating the stream information and identifying matching memory access requests for recognized streams.

Without intending to be limited by theory, the following test results illustrate performance improvements that can be achieved in some examples of these techniques. A benchmark program called "preflowpush" including a large number of small streams was tested along with SPECINT17 to show an example of the overall effects on integer performance.

A stride based prefetcher was used, and a 2-bit saturating counter was used for determining the value of the throttling condition $C_T$ of each stream. The value of the qualifying threshold $R_Q$ was set to L/4. The four states (0, 1, 2, and 3) of the 2-bit saturating counter, which started in the state 1 were: 0 (strongly long), 1 (weakly long), 2 (weakly short), and 3 (strongly short). The same condition described above $R_F<R_T$ was used to determine changes among these states. The states 0 and 1 correspond to a long stream with the throttling condition of false, and the states 2 and 3 correspond to a short stream with the throttling conduction of true.

The following table lists the relative speedups of the prefetch throttling ("Prefetcher+Throttle") compared against a baseline that does not support prefetch throttling ("Prefetcher+No Throttle").

|  | Prefetcher + No Throttle | Prefetcher + Throttle |
| --- | --- | --- |
| preflowpush | −7.60% | 1.02% |
| 600perlbench_s | 0.03% | 0.02% |
| 602gcc_s | 14.67% | 13.08% |
| 605mcf_s | 12.64% | 10.22% |
| 620omnetpp_s | 0.42% | 0.41% |
| 623xalancbmk_s | −0.42% | −0.43% |
| 625x264_s | 0.08% | −0.02% |
| 631deepsjeng_s | −0.12% | −0.13% |
| 641leela_s | −0.06% | −0.09% |
| 648exchange2_s | 0.12% | 0.11% |
| 657xz_s | 0.04% | 0.17% |
| specInt2017 | 2.60% | 2.23% |

These results show a significant change in performance on preflowpush with only a relatively small performance loss on SPECINT2017.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

Implementations of various techniques described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination.

Further, all or a portion of implementations of this disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described implementations and other aspects have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. An integrated circuit comprising:
   a cache system configured to store copies of data previously retrieved from a memory system;
   at least one processor core executing instructions in a pipeline, wherein the pipeline includes at least one stage that executes instructions that initiate memory access requests to access data in the memory system using requests to the cache system; and
   circuitry configured to manage prefetch requests associated with one or more memory access requests, the managing including:
      storing stream information associated with a plurality of streams, wherein at least one of the streams was recognized based on an initial subset of memory access requests within a previously performed set of related memory access requests and is associated with stream information that includes stream matching information and stream length information,
      after the previously performed set of related memory access requests has ended, identifying a matching memory access request that matches with a corresponding matched stream in the plurality of streams based at least in part on stream matching information within stream information associated with the matched stream, and
      in response to identifying the matching memory access request, determining whether or not to perform a prefetch request for data at an address related to a data address in the matching memory access request based at least in part on stream length information within the stream information associated with the matched stream.

2. The integrated circuit of claim 1, wherein the stream matching information depends on: (1) an address of data being requested by a memory access request in the initial subset of memory access requests, and (2) calling context information associated with an instruction that initiated the memory access request in the initial subset of memory access requests.

3. The integrated circuit of claim 2, wherein the pipeline includes at least one stage that issues instructions based on a program counter that identifies addresses of decoded instructions in the memory system.

4. The integrated circuit of claim 3, wherein the calling context information associated with the instruction that initiated the memory access request in the initial subset of memory access requests includes a value of the program counter that corresponds to an address of the instruction that initiated the memory access request in the initial subset of memory access request.

5. The integrated circuit of claim 4, wherein the calling context information associated with the instruction that initiated the memory access request in the initial subset of memory access requests includes status information associated with execution of the instruction that initiated the memory access request in the initial subset of memory access request.

6. The integrated circuit of claim 4, wherein the calling context information associated with the instruction that initiated the memory access request in the initial subset of memory access requests includes branch history information associated with one or more branch instructions that were executed before execution of the instruction that initiated the memory access request in the initial subset of memory access request.

7. The integrated circuit of claim 1, wherein the stream length information depends on a total number of memory access requests within the previously performed set of related memory access requests.

8. The integrated circuit of claim 7, wherein determining whether or not to perform a prefetch request for data at an address related to a data address in the matching memory access request further includes comparing a number of memory access requests in a current instance of the matched stream to a first stored threshold value if the stream length information indicates a previous instance of the matched stream had a length shorter than a second stored threshold value.

9. The integrated circuit of claim 8, wherein the second stored threshold value changes dynamically in response to total numbers of memory access requests within multiple previous instances of the matched stream.

10. The integrated circuit of claim 8, wherein the first stored threshold is based at least in part on a lookahead value associated with one or more of the prefetch requests.

11. The integrated circuit of claim 8, wherein different ones of the plurality of streams are associated with different values of the second stored threshold value.

12. The integrated circuit of claim 8, wherein different ones of the plurality of streams are associated with the same value of the second stored threshold value.

13. A method comprising:
  storing copies of data previously retrieved from a memory system;
  executing instructions in a pipeline, wherein the pipeline includes at least one stage that executes instructions that initiate memory access requests to access data in the memory system using requests to the stored copies; and
  managing prefetch requests associated with one or more memory access requests, the managing including:
    storing stream information associated with a plurality of streams, wherein at least one of the streams was recognized based on an initial subset of memory access requests within a previously performed set of related memory access requests and is associated with stream information that includes stream matching information and stream length information,
    after the previously performed set of related memory access requests has ended, identifying a matching memory access request that matches with a corresponding matched stream in the plurality of streams based at least in part on stream matching information within stream information associated with the matched stream, and
    in response to identifying the matching memory access request, determining whether or not to perform a prefetch request for data at an address related to a data address in the matching memory access request based at least in part on stream length information within the stream information associated with the matched stream.

14. The method of claim 13, wherein the stream matching information depends on: (1) an address of data being requested by a memory access request in the initial subset of memory access requests, and (2) calling context information associated with an instruction that initiated the memory access request in the initial subset of memory access requests.

15. The method of claim 14, wherein the pipeline includes at least one stage that issues instructions based on a program counter that identifies addresses of decoded instructions in the memory system.

16. The method of claim 15, wherein the calling context information associated with the instruction that initiated the memory access request in the initial subset of memory access requests includes a value of the program counter that corresponds to an address of the instruction that initiated the memory access request in the initial subset of memory access request.

17. The method of claim 16, wherein the calling context information associated with the instruction that initiated the memory access request in the initial subset of memory access requests includes branch history information associated with one or more branch instructions that were executed before execution of the instruction that initiated the memory access request in the initial subset of memory access request.

18. The method of claim 13, wherein the stream length information depends on a total number of memory access requests within the previously performed set of related memory access requests.

19. The method of claim 18, wherein determining whether or not to perform a prefetch request for data at an address related to a data address in the matching memory access request further includes comparing a number of memory access requests in a current instance of the matched stream to a first stored threshold value if the stream length information indicates a previous instance of the matched stream had a length shorter than a second stored threshold value.

20. An apparatus comprising:
  means for storing copies of data previously retrieved from a memory system;
  means for executing instructions in a pipeline, wherein the pipeline includes at least one stage that executes instructions that initiate memory access requests to access data in the memory system using requests to the stored copies; and means for managing prefetch requests associated with one or more memory access requests, the managing including:
  storing stream information associated with a plurality of streams, wherein at least one of the streams was recognized based on an initial subset of memory access requests within a previously performed set of related memory access requests and is associated with stream information that includes stream matching information and stream length information,
  after the previously performed set of related memory access requests has ended, identifying a matching memory access request that matches with a corresponding matched stream in the plurality of streams based at least in part on stream matching information within stream information associated with the matched stream, and
  in response to identifying the matching memory access request, determining whether or not to perform a prefetch request for data at an address related to a data address in the matching memory access request based at least in part on stream length information within the stream information associated with the matched stream.

* * * * *